Figure 1:
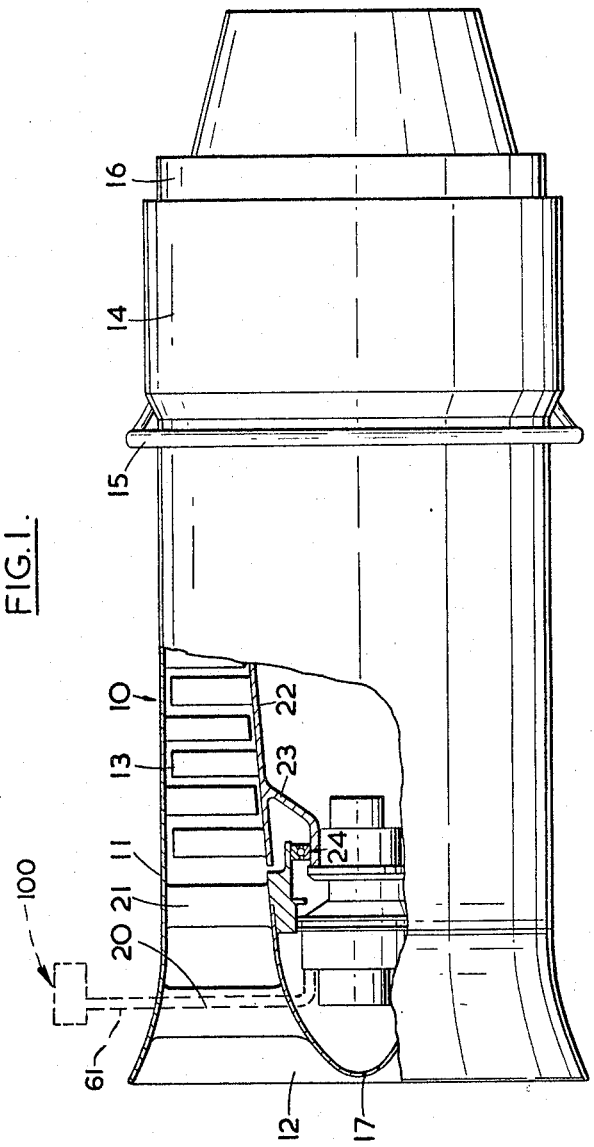

Aug. 16, 1966    R. V. BLACKHURST ET AL    3,266,596
LUBRICATION OF BEARINGS
Filed July 1, 1963                                    3 Sheets-Sheet 3

United States Patent Office 3,266,596
Patented August 16, 1966

3,266,596
LUBRICATION OF BEARINGS
Robert Vaughan Blackhurst, Ripley, Derby, and Eric Evans, Derby, England, assignors to Rolls-Royce Limited, Derby, England, a company of Great Britain
Filed July 1, 1963, Ser. No. 291,882
Claims priority, application Great Britain, Aug. 2, 1962, 29,820/62
5 Claims. (Cl. 184—6)

This invention concerns improvements relating to the lubrication of bearings.

Broadly, the invention comprises apparatus comprising a bearing which is carried by fixed structure, a shaft which is rotatably mounted in the bearing, an annular lubricating oil reservoir mounted within said shaft, and means for feeding oil from said reservoir to said bearing.

According to the preferred form of the present invention, there is provided apparatus comprising a casing, a first bearing which is mounted within and carried by said casing, a first shaft which is rotatably mounted in and supported by the first bearing, annular structure which is mounted within and radially spaced from said first shaft and which is carried by said casing, a second bearing which is mounted within and carrier by said annular structure, a second shaft which is rotatably mounted in and supported by the second bearing, and means for feeding lubricating oil from said annular structure to said first and second bearings so as to lubricate the latter.

The said annular structure preferably includes an annular lubricating oil reservoir. The said annular structure also preferably includes an annular member through which passes a first oil conduit which extends to said reservoir, a second oil conduit being provided which communicates both with the first oil conduit and with the second bearing.

Means are preferably provided for supplying a drip feed of lubricating oil from said reservoir to said first bearing.

The second shaft may be driven from the first shaft by way of sleeves which are concentric with respect to said shafts and which are splined to said shafts and to each other. Thus one of said sleeves may have a frusto-conical portion from one part of which leads a passage extending to the first bearing and onto a smaller diameter part of which may drip lubricating oil from said reservoir, the construction being such that rotation of said sleeve will cause the lubricating oil to travel along said frusto-conical portion towards the said passage.

Means are preferably provided for conveying lubricating oil which has passed through the second bearing to at least some of said splines. Thus the said reservoir may have a frusto-conical internal wall whose small diameter end is arranged to receive lubricating oil which has passed through the second bearing, the construction being such that the said lubricating oil may flow towards the large diameter end of said internal wall and may pass therefrom to some of said splines.

The said first shaft may carry a member having a plurality of angularly spaced apart compartments which are arranged to receive lubricating oil which has passed through the last-mentioned splines, the radially inner end of each compartment communicating with the internal surface of a sleeve which has a splined connection to the second shaft, whereby the lubricating oil may be supplied to the said splined connection.

The invention also comprises a gas turbine engine which is provided with apparatus as set forth above, the said casing being the engine casing of the gas turbine engine, the said first shaft being the shaft on which the compressor and the turbine of the engine are mounted, the said first bearing being disposed adjacent the upstream end of the said first shaft, and the said second shaft being arranged to drive a fuel pump of the engine.

Figure 2:
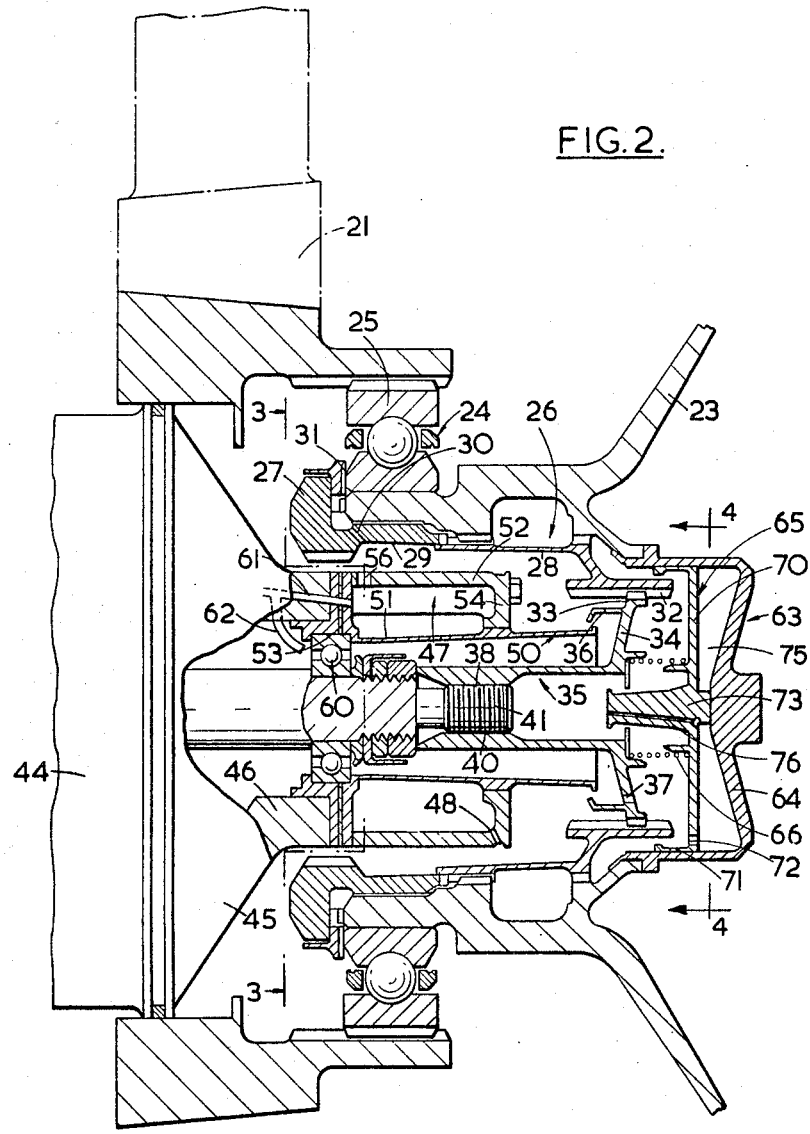
Figure 3:
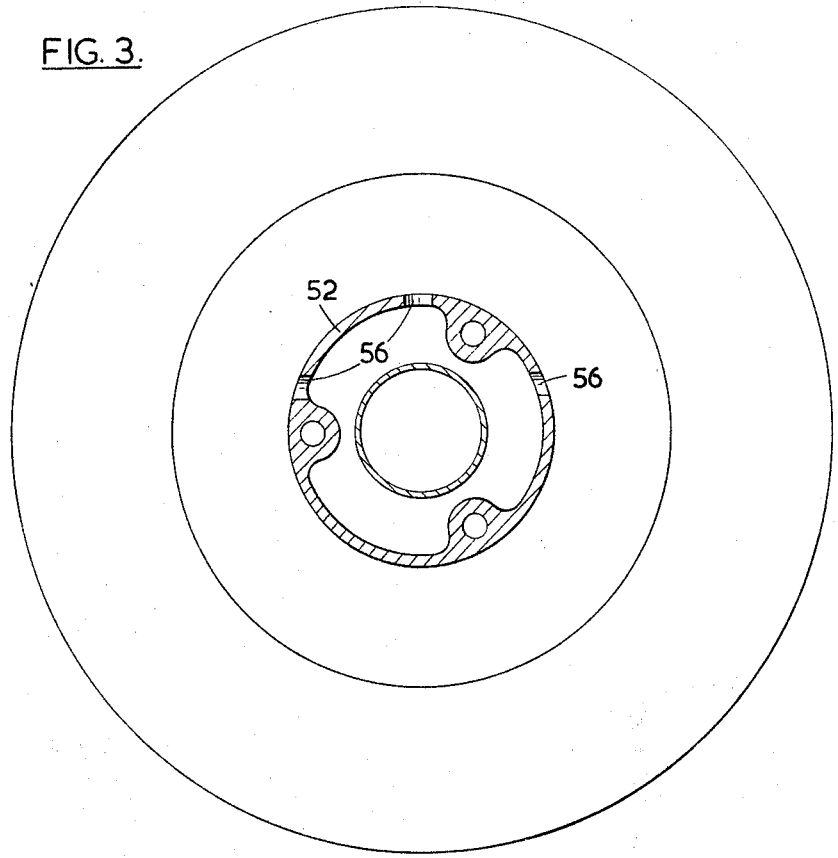
Figure 4:
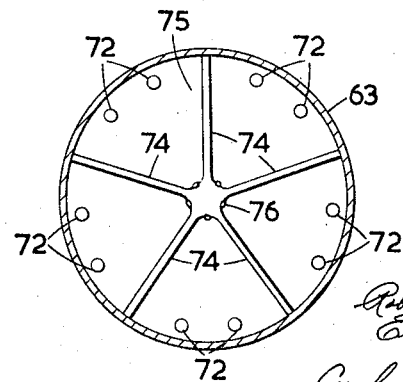

The invention is illustrated, merely by way of example, in the accompanying drawings, in which:

FIG. 1 is a diagrammatic view, partly in section, of a gas turbine engine embodying the present invention, FIG. 2 is a view, mainly in section, illustrating part of the structure of FIG. 1 on a larger scale, and FIGS. 3 and 4 are sections taken respectively on the lines 3—3 and 4—4 of FIG. 2.

Referring to the drawings, a gas turbine engine 10 for aircraft propulsion has an engine casing 11 within which are arranged in flow series an air intake 12, a compressor 13, combustion equipment 14 (which is supplied with fuel from a fuel manifold 15), and a turbine 16.

Mounted within the air intake 12 is a hollow nose cone 17, which is supported from the engine casing 11 by an assembly of angularly spaced apart intake struts 20 and by an assembly of angularly spaced apart inlet guide vanes 21.

The compressor 13 and turbine 16 are mounted on a shaft 22. The shaft 22 has, at its upstream end, a shaft portion 23 which is rotatably mounted within a ball bearing 24. The ball bearing 24 has an outer race 25 (see FIG. 2) which is mounted closely within the inlet guide vanes 21 and which is thus carried by the engine casing 11.

The shaft portion 23 is splined to sleeves 26, 27, which have frusto-conical portions 28, 29 respectively. The sleeve 27 has drillings 30, 31 through which lubricating oil which has been supplied to the frusto-conical portion 29 may pass to the bearing 24.

The sleeve 26 has a portion which is provided with splines 32. The splines 32 engage splines 33 on a flange 34 which forms part of a sleeve 35. The sleeve 35 has a lipped flange 36 which is adapted to form a trap for the reception of lubricating oil, the flange 34 being provided with a plurality of angularly spaced apart apertures 37 through which the lubricating oil may escape from the said trap.

The sleeve 35 also has splines 38, which mesh with splines 40 on a shaft 41. The shaft 41 is in a drive input shaft of an engine fuel pump 44 which is carried by the inlet guide vanes 21 and thus also by the engine casing 11, the engine fuel pump 44 being housed within the hollow nose cone 17.

The fuel pump 44 has a frusto-conical end cap 45 which has an annular flange 46 at its downstream end, the shaft 41 being mounted concentrically within and extending through the annular flange 46. The annular flange 46 carries, at its downstream end, a lubricating oil reservoir 47. The lower portion of the reservoir 47 has a drilling 48 through a metered flow of oil may drip onto the frusto-conical portion 28 of the sleeve 26.

The reservoir 47 is formed by a substantially cylindrical member 50, which has a frusto-conical wall 51 whose diameter increases in a downstream direction, and a substantially cylindrical member 52. The member 50 has a radially outwardly extending annular flange 53 which is secured to the annular flange 46 and to the substantially cylindrical member 52. The latter has a radially inwardly directed flange 54 at its downstream end, the flange 54 being secured to the wall 51.

Three angularly spaced apart holes 56 are provided in the member 52 and are so arranged as to ensure that, irrespective of whether the engine is arranged horizontally as shown, or is arranged vertically, only a predetermined quantity of lubricating oil can be introduced into the reservoir 47 before the latter overflows. The holes 56 also, of course, constitute vent holes.

Mounted within and carried by the reservoir 47 and by the annular flange 46 is a ball bearing 60 within which is rotatably mounted the shaft 41 which drives the fuel pump 44.

Oil may be introduced by means schematically shown in broken lines at 100 (e.g. by means of the oil discharge pump disclosed in the co-pending Keen et al. United States patent application Serial No. 256,874 now United States Patent No. 3,154,919, issued November 3, 1964) into the reservoir 47 by way of an oil conduit 61 extends through the annular flange 46. An oil conduit 62 which communicates with the oil conduit 61, is provided to convey lubricating oil from the oil conduit 61 to the bearing 60.

Mounted internally of the shaft portion 23 and secured thereto is a cup-shaped member 63 which has a substantially conical end wall 64. Mounted within the cup-shaped member 63 is a plate-like member 65. The latter is urged into contact with the cup-shaped member 63 by a spring 66 which bears against the flange 34.

The plate-like member 65, which has a radially extending wall 70, has a lipped flange 71 which bears against the cup-shaped member 63. The lipped flange 71 is adapted to form a trap for the reception of lubricating oil, the wall 70 having a plurality of angularly spaced apart apertures 72 therein through which the lubricating oil may escape from the said trap.

The wall 70 is provided at its centre with a boss 73 which projects upstream therefrom and extends to within the sleeve 35.

The downstream face of the wall 70 is provided with a plurality of angularly spaced apart radially extending ribs 74 (best seen in FIG. 4). The downstream edge of each of the ribs 74 is inclined so as to abut the end wall 64 and thereby form sector-shaped compartments 75. Each said compartment 75 communicates at its radially inner end with the respective one of a plurality of drillings 76 which extend through the boss 73 to the upstream end thereof.

In operation, the reservoir 47 is first of all charged with a single shot of lubricating oil, the oil passing to the reservoir 47 through the oil conduit 61. As explained above, the holes 56 ensure that the reservoir 47 will be filled with only a predetermined quantity of oil. The oil then drips through the drilling 48 onto the frusto-conical portion 28 of the sleeve 26.

The oil will then be caused by centrifugal forces to flow upstream over the internal surface of the frusto-conical portion 28 to the larger diameter end thereof and thence upstream over the internal surface of the frusto-conical portion 29 towards the larger diameter end of the latter. The oil will then pass through the drillings 30, 31 to the bearing 24 from which it is scavenged by a scavenge pump (not shown).

The bearing 60 is lubricated with oil from the conduit 62. After the oil has passed through the bearing 60 the oil flows downstream, under gravity, over the lower portion of the interior surface of the wall 51. The oil then falls into the trap provided in the lipped flange 36 and then passes through the apertures 37 so as to lubricate the splines 32, 33.

After this, the oil passes into the trap formed in the lipped flange 71 and so flows through the apertures 72 into the compartments 75.

When the shaft portion 23 is stationary, oil will collect in the uppermost compartment or compartments 75 and will drain therefrom, via the respective drilling or drillings 76, so as to drop onto the internal surface of the sleeve 35. The pool of oil which collects in the sleeve 35 will be fed to the splines 40, 41. Immediately the compressor 13 (and hence the shaft portion 23) starts to rotate.

We claim:
1. Apparatus comprising a casing, a first bearing which is mounted within and carried by said casing, a first shaft which is rotatably mounted in and supported by the first bearing, an annular member which is mounted within and radially spaced from said first shaft and which is carried by said casing, an annular lubricating oil reservoir which is carried by said annular member, a second bearing which is mounted within and carried by said annular member, a first oil conduit which extends through the annular member to said reservoir, a second oil conduit which communicates both with the first oil conduit and with the second bearing, a second shaft which is rotatably mounted in and supported by the second bearing, a frusto-conical member rotatable by said first shaft, said frusto-conical member having a smaller diameter part diverging into a larger diameter part, means enabling lubricating oil from said reservoir to drip onto the smaller diameter part of the frusto-conical member, means enabling lubricating oil to pass from the larger diameter part of the frusto-conical member to the first bearing, and means for supplying lubricating oil to said first oil conduit.

2. Apparatus comprising a casing, a first bearing which is mounted within and carried by said casing, a first shaft which is rotatably mounted in and supported by the first bearing, an annular member which is mounted within and radially spaced from said first shaft and which is carried by said casing, an annular lubricating oil reservoir which is carried by said annular member, a second bearing which is mounted within and carried by said annular member, a first oil conduit which extends through the annular member to said reservoir, a second oil conduit which communicates both with the first oil conduit and with the second bearing, a second shaft which is rotatably mounted in and supported by the second bearing, two sleeves which are concentric with respect to said shafts, splines by means of which the sleeves are splined to said shafts and to each other, one of said sleeves having a frusto-conical portion, a passage extending from one part of the frusto-conical portion to the first bearing, means enabling lubricating oil from said reservoir to drip onto a smaller diameter part of the frusto-conical portion, rotation of said one sleeve causing the lubricating oil to travel along said frusto-conical portion towards the said passage, and means for supplying lubricating oil to said first oil conduit.

3. Apparatus comprising a casing, a first bearing which is mounted within and carried by said casing, a first shaft which is rotatably mounted in and supported by the first bearing, an annular member which is mounted within and radially spaced from said first shaft and which is carried by said casing, an annular lubricating oil reservoir which is carried by said annular member, a second bearing which is mounted within and carried by said annular member, a first oil conduit which extends through the annular member to said reservoir, a second oil conduit which communicates both with the first oil conduit and with the second bearing, a second shaft which is rotatably mounted in and supported by the second bearing, two sleeves which are concentric with respect to said shafts, splines by means of which the sleeves are splined to said shafts and to each other, one of said sleeves having a frusto-conical portion, a passage extending from one part of the frusto-conical portion to the first bearing, means enabling lubricating oil from said reservoir to drip onto a smaller diameter part of the frusto-conical portion, rotation of said one sleeve causing the lubricating oil to travel along said frusto-conical portion towards the said passage, means for supplying lubricating oil to said first conduit, and means for conveying lubricating oil which has passed through the second bearing to at least some of said splines.

4. Apparatus as claimed in claim 3 in which the said reservoir has a frusto-conical internal wall whose small diameter end receives lubricating oil which has passed through the second bearing, whereby the said lubricating oil may flow towards the large diameter end of said internal wall and may pass therefrom to some of said splines.

5. Apparatus as claimed in claim 4 in which the said first shaft carries a member having a plurality of angularly spaced apart compartments which receive lubricating oil which has passed through the last-mentioned splines, the radially inner end of each compartment communicating with the internal surface of a sleeve which has a splined connection to the second shaft, whereby the lubricating oil may be supplied to the said splined connection.

References Cited by the Examiner

UNITED STATES PATENTS

| | | | |
|---|---|---|---|
| 434,480 | 8/1890 | Simonds | 308—183 |
| 2,712,967 | 7/1955 | Sutton | 184—6 X |
| 2,761,281 | 9/1956 | Armer | 60—39.08 |
| 2,874,803 | 2/1959 | Gunberg | 60—39.08 |
| 2,911,267 | 11/1959 | Small. | |

FOREIGN PATENTS 876,862  9/1961  Great Britain.

MARK NEWMAN, *Primary Examiner.*

D. HART, *Assistant Examiner.*